(12) United States Patent
Nitta et al.

(10) Patent No.: US 7,973,781 B2
(45) Date of Patent: Jul. 5, 2011

(54) IMAGE DISPLAY DEVICE AND PROJECTOR

(75) Inventors: Takashi Nitta, Chino (JP); Junichi Nakamura, Shiojiri (JP); Tsunemori Asahi, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 836 days.

(21) Appl. No.: 11/683,155

(22) Filed: Mar. 7, 2007

(65) Prior Publication Data
US 2007/0211218 A1    Sep. 13, 2007

(30) Foreign Application Priority Data
Mar. 13, 2006    (JP) ................................. 2006-067599

(51) Int. Cl.
G06F 3/038    (2006.01)
(52) U.S. Cl. ...................................................... 345/204
(58) Field of Classification Search .................. None
See application file for complete search history.

(56) References Cited

U.S. PATENT DOCUMENTS

| | | | |
|---|---|---|---|
| 6,275,271 B1 * | 8/2001 | Hitomi et al. ................. | 348/743 |
| 2002/0003522 A1 * | 1/2002 | Baba et al. ....................... | 345/89 |
| 2005/0190140 A1 * | 9/2005 | Asahi et al. .................... | 345/100 |

FOREIGN PATENT DOCUMENTS

| | | |
|---|---|---|
| JP | A 2000-259126 | 9/2000 |
| JP | A 2001-125067 | 5/2001 |
| JP | A 2005-284251 | 10/2005 |

* cited by examiner

*Primary Examiner* — Stephen G Sherman
*Assistant Examiner* — Kenneth Bukowski
(74) *Attorney, Agent, or Firm* — Oliff & Berridge, PLC (57) ABSTRACT

There is provided an image display device with a two-modulation optical system for displaying an image corresponding to input image signals. The image display device includes a first optical modulation element for turning on or off pixels every subfield in the unit of plane; and second optical modulation elements for displaying gradation of the pixels in the unit of line, the first optical modulation element and the second optical modulation element are arranged optically in series; a second optical modulation element drive unit for driving the second optical modulation elements in a line-sequential manner; and a first optical modulation element drive unit for generating a control signal for controlling the pixels in lines disposed to correspond to the unit of single or several lines of the line-sequential driving of the second modulation elements with a driving interval in the unit of single or several lines and controlling the first optical modulation element in synchronism with the unit of single or several lines.

9 Claims, 7 Drawing Sheets

IMAGE DISPLAY DEVICE AND PROJECTOR

BACKGROUND

1. Technical Field

The present invention relates to an image display device for displaying images with a great number of gradation steps, and more particularly, to an image display device and a projector highly suitable for displaying images with high gradation.

2. Related Art

In recent years, image quality of electronic display devices such as an LCD (Liquid Crystal Display), an EL (Electroluminescence) display, a CRT (Cathode Ray Tube), and a projection type display has been remarkably improved. A device having characteristics such as resolution and color gamut almost comparable to a visual characteristic of human eyes has been put into practice.

However, a reproduction range of a luminance dynamic range is limited to about 1 to $10^2$ [nit], and the gradation step is generally expressed by 8 bits.

On the other hand, it is said that human eyes can perceive a luminance dynamic range of about $10^{-2}$ to $10^4$ [nit] at a time and has a luminance differentiation capability of 0.2 [nit]. When the luminance dynamic range is converted into a gradation number in consideration of the luminance differentiation capability, it can be said that an amount of data corresponding to around 12 bits are required.

When a display image of a current electronic display device is viewed through such visual characteristic, the luminance dynamic range is conspicuously narrow. Moreover, since the gradation resolution in the shadow portions and the highlight portions is insufficient, the reality of the display image and its power of expression seem inadequate.

Furthermore, images in computer graphics (CG) used in movies, games and the like, there is a mainstream trend to pursue reality of depiction by giving the display data with the luminance dynamic range and gradation characteristic close to those of the human vision.

However, since the electronic display device has insufficient capability, there is a problem that the power of expression inherent to CG contents (which has a greater number of bits for expressing the gradation) is not fully exerted when displaying images of the CG contents.

Further, in the next-generation Windows®, the adaptation of a 16-bit color space is planned, and the dynamic range and the gradation steps will increase remarkably in comparison with the current 8-bit color space. Therefore, the need for an electronic display device capable of fully expressing the 16-bit color space and achieving a high dynamic range and high gradation is expected to increase.

Among the electronic display devices, a project ion type display device (projector), such as a liquid crystal projector and a DLP (registered trademark) (Digital Light Processing) projector, can display an image on a large screen, and is therefore effective for reproducing the reality and the power of expression of displayed image.

In the electronic display device, various proposals have been suggested in order to widen the luminance dynamic range.

For example, in the case of using a digital-driven modulation display element such as a ferroelectric liquid crystal panel or a reflection type optical modulation element (DMD), a subfield driven time integral gradation scheme is used as a method of displaying the gradation steps, and the entire pixels are rewritten in the unit of a plane, i.e., the entire pixels are simultaneously turned on or off in the unit of a display screen (see JP-A-2000-259126 for example).

On the other hand, in the case of using a liquid crystal display panel, a display process is performed in the unit of scanlines in which each pixel is driven in a line-sequential manner (see JP-A-2001-125067 for example).

However, in the case of the image display device with the two-modulation optical system configured by the use of the digital-driven modulation display element and the liquid crystal display element, the image data of the digital-driven modulation display element are switched in the unit of planes whereas the image data of the liquid crystal display element are switched in the unit of lines. The gradation setting values may deviate greatly with time between the first scanline and the last scanline on the screen at the time of switching the image data in the unit of planes. Accordingly, it is difficult to improve contrast ratio on the entire display screen.

In addition, in the liquid crystal display element, due to an orientation change response characteristic, it takes time for a luminance value of output light beams to become a value corresponding to a control voltage after application of the control voltage, thereby causing a problem of further increasing deviation of the setting times.

When the two-modulation optical system is configured by the combination of the digital-driven modulation display element of which the entire image data are switched in the unit of planes and the liquid crystal display element in which the image data are switched in the unit of scanlines, timings for displaying gradation become inconsistent with each other between the digital-driven modulation display element and the liquid crystal display element, which makes it difficult to display an exact gradation characteristic that aims to realize a high contrast ratio, thereby deteriorating an image quality.

In addition, JP-A-2000-259126 discloses a technology in which, in order to improve a moving picture display performance of the liquid crystal display element, black display timing is inserted at every time of displaying a frame by controlling lighting or un-lighting of the light source so as to absorb the timing deviation, thereby improving the moving picture display performance.

According to the technology disclosed in JP-A-2000-259126, an individual lighting control is performed in which backlights are divided in correspondence with scanlines at a predetermined area and the back light corresponding to areas of the scanlines to which the image data are rewritten is sequentially lighted in consideration of the line-sequential driving of the liquid crystal display element and the response characteristic of the liquid crystal.

In the technology disclosed in JP-A-2000-259126, without the individual controlling, it is difficult to obtain a desired gradation display since decrease in the display luminance becomes prominent due to the orientation change of the liquid crystal, i.e., a transient characteristic of rising and falling of the liquid crystal.

However, in the technology described above, it requires a special areal light source or a driving control circuit for lighting the light source at each of the areas, thereby increasing the production cost.

Although it is controlled individually, assuming that a cathode ray tube used in the liquid crystal display element or the like is generally used as the light source, it may be difficult to control the lighting to a delicate unit (the number of scanlines), which makes it difficult to prevent the deterioration of the image quality.

SUMMARY

An advantage of an aspect of the invention is that it provides an image display device and a projector capable of performing a high quality gradation display by performing a rewriting process of a digital-driven modulation element in synchronism with a line-sequential rewriting timing of liquid crystal display element, in the image display device with a two-modulation optical system in which the digital-driven modulation display element for performing the rewriting process in units of planes and the liquid crystal display element for sequentially performing the rewriting process in units of scan lines are serially arranged in units of pixels.

According to an aspect of the invention, there is provided an image display device with a two-modulation optical system for displaying an image corresponding to input image signals, and the image display device including: a first optical modulation element for turning on or off pixels every subfield in the unit of plane; a second optical modulation element for displaying gradation of the pixels in the unit of line, the first optical modulation element and the second optical modulation element are arranged optically in series; a second optical modulation element drive unit for driving the second optical modulation element in a line-sequential manner; and a first optical modulation element drive unit for generating a control signal for controlling the pixels in lines disposed to correspond to the unit of single or several lines of the line-sequential driving of the second modulation element with a driving interval in the unit of single or several lines and controlling the first optical modulation element in synchronism with the unit of single or several lines.

With the above-mentioned arrangement, according to the image display device of the aspect of the invention, in the two-modulation optical system constituted by the first optical modulation element for turning on or off pixels in the unit of plane and the second optical modulation element for displaying gradation of the pixels in the unit of scanlines, since the control signals for turning on or off the pixels in the unit of plane are generated in synchronism with the line-sequential driving timing of the second optical modulation element, it is possible to control the gradation to correspond to the second optical modulation element, thereby preventing deterioration of the image quality.

According to the image display device of the aspect of the invention, the first optical modulation element drive unit generates a control signal, the control signal is constructed to include a first control signal corresponding to a gradation control of subfields in a present frame and a second control signal corresponding to a gradation control of subfields in the next frame with the driving interval in the driving of the second optical modulation drive unit so as to allow a proportion of the first control signal correspond to a time delay of the second optical modulation element with respect to the first optical modulation element drive unit.

With the above-mentioned arrangement, according to the image display device of the aspect of the invention, since the subfields corresponding to the delay of the gradation display of the second optical modulation element in the unit of subfield are controlled by the control signals corresponding to the delayed image signals which should have been displayed in the previous frame, it is possible to adjust and correct the gradation display error in the first and second optical modulation element by controlling the subfields of the first optical modulation element, thereby preventing image quality deterioration.

According to the image display device of the aspect of the invention, the first optical modulation element drive unit includes a first memory and a second memory, and when one of the first memory and the second memory outputs the control signal to the first optical modulation element drive unit, the other is allowed to store the control signal for the first optical modulation element in the next frame.

With the above-mentioned arrangement, since the image display device of the aspect of the invention is provided with two memories, that is the first and second memories in correspondence with the driving interval of the second optical modulation element, it is possible to generate the control signals used as a timing of the next driving interval in the first optical modulation element without stopping the display process, thereby smoothly displaying the images without deteriorating image quality.

In the image display device of the aspect of the invention, the first optical modulation element drive unit displays black during a period of single or plural subfields at every field.

In the image display device of the aspect of the invention, the first optical modulation element drive unit turns off the first optical modulation element during the period of the plural subfields in which black is displayed and controls the gradation of the other subfields of a frame, in the unit of the driving interval.

In the image display device of the aspect of the invention, the first optical modulation element drive unit interposes the control signal, corresponding to the subfields in which black is displayed, between the first control signal for controlling the subfields of a previous frame and the second control signal for controlling the subfields of the present frame.

With the above-mentioned arrangement, according to the image display device of the aspect of the invention, it is possible to eliminate the sense of latent images with respect to the delay of the orientation change response characteristic of the liquid crystal, thereby improving the moving picture display characteristic.

In the image display device of the aspect of the invention, the frame includes a plurality of primary subfields in the same unit of control time and secondary subfields in different units of times into which the time of the primary subfields is divided, and the first optical modulation element drive unit sets the proportion of the first control signal and the second control signal so as to correspond to the primary subframes.

In the image display device of the aspect of the invention, the first optical modulation element drive unit fixes and outputs time positions indicating the secondary subfields in a frame period.

In the image display device of the aspect of the invention, the first optical modulation element drive unit fixes the time positions to a blanking time of the second optical modulation element drive unit.

With the above-mentioned arrangement, according to the image display device of the aspect of the invention, since the gradation control is finished in the entire scanlines of the second optical modulation element and the gradation control is stably performed the first optical modulation element, it does not deteriorate the image quality. In this case, the control of the secondary subfields should correspond to the image data of the present frame.

A projector according to an aspect of the invention is configured to have the image display device described above and a projection optical system provided in the image display device.

With the above-mentioned arrangement, according to the projector of the aspect of the invention, since the control signals for turning on and off the pixels in the unit of plane are generated in synchronism with the line-sequential driving timing of the second optical modulation element, it is possible to control the gradation to correspond to the second optical modulation element, thereby preventing deterioration of the image quality.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
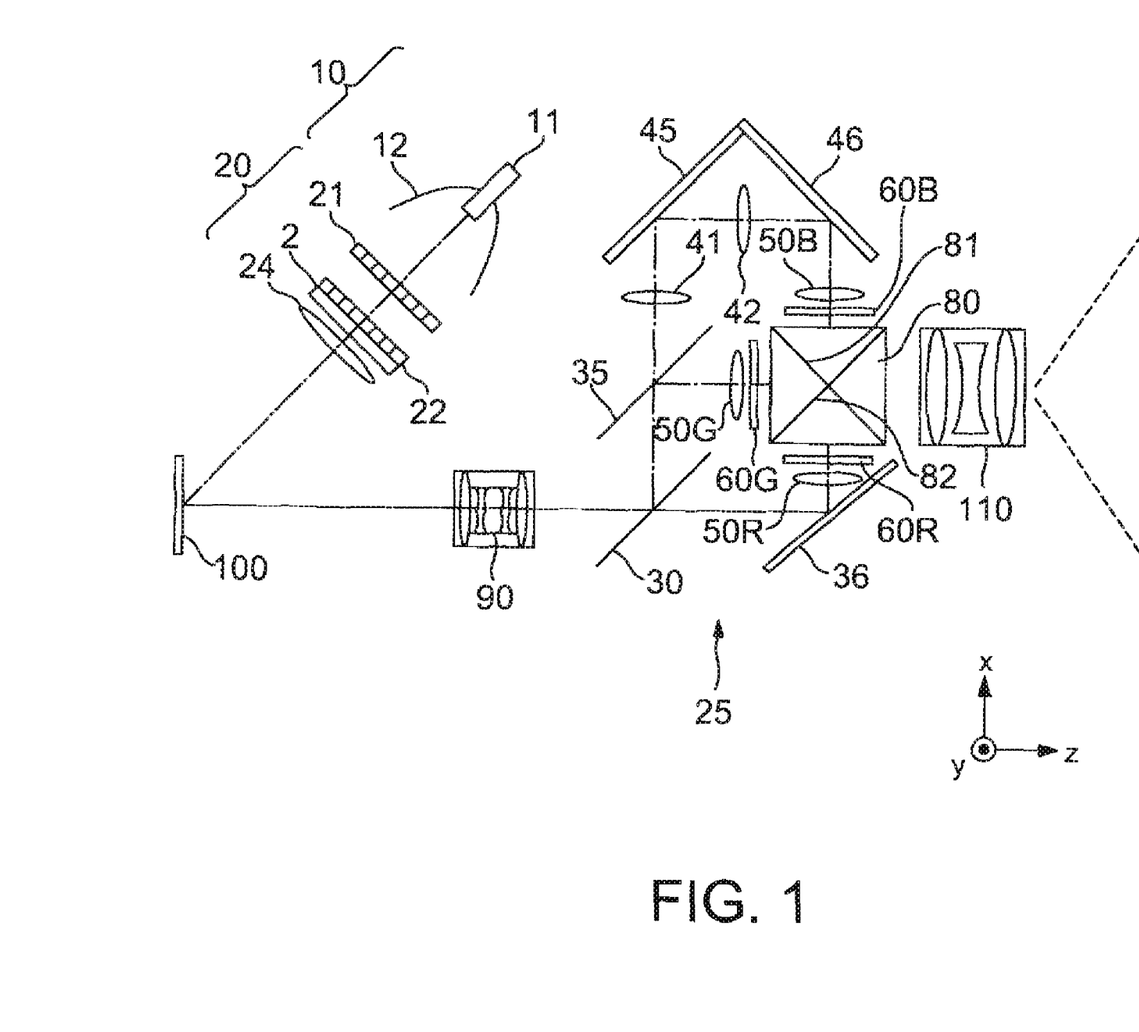
FIG. 1 is a schematic diagram showing a hardware configuration of a projector utilizing an image display device according to an embodiment of the invention.

Hereinafter, a projector utilizing an image display device according to an embodiment of the invention will be described with reference to drawings. FIG. 1 is a block diagram showing a configuration of the embodiment of the invention.

In the present embodiment, description will be made to an example of a projection type liquid crystal display device in which a single reflection type modulation element (for example, DMD: Digital Micro-mirror Device) is used as a first optical modulation unit and transmission type liquid crystal light valves corresponding co each color of R (red), G (green), and B (blue) are used as a second optical modulation unit. In the following descriptions, the first optical modulation unit. The first optical modulation unit and the second optical modulation unit will be referred to as a reflection tripe optical modulation element and a color modulation liquid crystal light valve, respectively. In each diagram used in the following descriptions, the scale of each component will be suitably modified to enable perception of the component.

The first optical modulation unit performing a luminance modulation process is a display element having a linear gradation characteristic, and the second optical modulation unit performing a color modulation process is a display element having a nonlinear gradation characteristic.

FIG. 1 is a diagram showing a major optical configuration of a projector PJ1 (a projection type display device). The projector PJ1 is configured to include a light source 10; a uniform illumination system 20 that makes a luminance distribution of light beams coming incident thereon from the light source 10 uniform; a reflection type optical modulation element 100 serving as a first optical modulation unit that modulates luminance of light beams coming incident thereon from uniform illumination system 20 in all the wavelength regions; a relay lens 90 that relays light beams coming incident thereon from the reflection type optical modulation element 100; a color modulation unit 25 that modulates luminance of three primary colors, RGB, among the wavelength regions of the light beams coming incident thereon from the relay lens 90 (including three transmission type liquid crystal light valves serving as a second optical modulation element, that is, a transmission type liquid crystal light valve 60B for a blue light beam, a transmission type liquid crystal light valve 60G for a green light beam, and a transmission type liquid crystal light valve 60R for a red light beam); and a projection lens 110 that projects light beams coming incident thereon from the color modulation unit 25 onto a screen 120.

The reflection type optical modulation element 100 is a display element having a linear gradation characteristic that controls gradation using a time integral gradation scheme such as DMD. The light source 10 includes a lamp 11 such as an ultra-high pressure mercury lamp or a xenon lamp, and a reflector 12 that reflects or collects light beams emitted from the lamp 11.

The uniform illumination system 20 is configured to include first and second lens arrays 21 and 22 formed of fly-eye lenses or the like, a polarization conversion element 23, and a collector lens 24. The luminance distribution of the light beams emitted from the light source 10 is made uniform by the first and second lens arrays 21 and 22. The light beams having passed through the first and second lens arrays 21 and 22 is then polarized by the polarization conversion element 23 in a polarization direction in which the light beams are allowed to go incident on the color modulation unit 25. The polarized light beams are collected by the collector lens 24 so that it exits toward the relay lens 90.

The light beams output from the relay lens 90 is allowed to go incident on the reflection type optical modulation element 100 and then subjected to a first modulation process. The reflection type optical modulation element 100 is a display element having a linear gradation characteristic that modulates luminance of the light beams coming incident thereon in all the wavelength regions.

The polarization conversion element 23 is formed, for example, of a PBS array and a ½ wave plate and converts random polarized light beams to a specific linear polarized light beams.

The color modulation unit 25 is configured to include two dichroic mirrors 30 and 35 serving as a light separation unit, three mirrors (reflection mirrors 36, 45, and 46), five field lenses (a lens 41, a relay lens 42, and parallelizing lenses 50B, 50G, and 50R), three liquid crystal light valves 60B, 60G, and 60R, and a cross dichroic prism 80.

The dichroic mirrors 30 and 35 separate (isolate) the light beams (white light) from the light source 10 to light beams of three primary colors, RGB representing red (R), green (G), and blue (B). The dichroic mirror 30 is a glass plate on which dichroic films having a characteristic of reflecting a B light beam and a G light beam and transmitting an K light beam. Among the white light beams from the light source 10, the dichroic mirror 30 reflects the B light beam and the G light beam and transmits the R light beam included in the white light beams. The dichroic mirror 35 is a glass plate on which a dichroic film having a characteristic of reflecting a G light beam and transmitting a B light beam. Among the G light beam and the B light beam reflected on the dichroic mirror 30, the dichroic mirror 35 reflects the G light beam so as to be conveyed to the parallelizing lens 50G and transmits the B light beam so as to be conveyed to the lens 41.

The relay lens 42 conveys light beams (light intensity distribution) in the vicinity of the lens 41 to the vicinity of the parallelizing lens 50B. The lens 41 is furnished with a function of efficiently allowing light beams to go incident on the relay lens 42. The B light beam coming incident on the lens 41 is conveyed to the spatially remote liquid crystal light valve 60B while maintaining the intensity distribution almost intact and hardly causing a light loss.

The parallelizing lenses 50B, 50G, and 50R are furnished with functions of making light beams of respective colors that go incident on the corresponding liquid crystal light valves 60B, 60G, and 60R substantially parallel to each other, so that the light beams goes incident on the liquid crystal light valves 60B, 60G, and 60R efficiently. Light of three primary colors, RGB, separated by the dichroic mirrors 30 and 35 goes incident on the liquid crystal light valves 60B, 60G, and 60R via the mirrors (the reflection mirrors 36, 45, and 46) and the lenses (the lens 41, the relay lens 42, and the parallelizing lenses 50B, 50G, and 50R) described above.

Each of the liquid crystal light valves 60B, 60G, and 60R is an active-matrix liquid crystal display element including a glass substrate on which pixel electrodes and switching elements for driving the pixel electrodes, such as thin-film transistor elements and thin-film diodes, are formed in a matrix fashion, a glass substrate on which a cordon electrode is formed on the entire surface thereof, a TN type liquid crystal sandwiched between these two glass substrates, and a polarizer disposed on the outer surfaces.

The liquid crystal light valves 60B, 60G, and 60R are driven in a normally white mode in which they are in a white/bright (transmissive) state while no voltage is applied thereto and in a black/dark (non-transmissive) state while a voltage is applied thereto or in an opposite normally black mode. The gradation from bright to dark is controlled in an analog manner in accordance with a given control value. The liquid crystal light valve 60B modulates the B light beam coming incident thereon in accordance with display image data, and modulated light beam having optical image thereon is emitted from the liquid crystal light valve 60B. The liquid crystal light valve 60G modulates the G light beam coming incident thereon in accordance with display image data, and modulated light beam having optical image thereon is emitted from the liquid crystal light valve 60G. The liquid crystal light valve 60R modulates the R light beam coming incident thereon in accordance with display image data, and modulated light beam having optical image thereon is emitted from the liquid crystal light valve 60R.

The cross dichroic prism 80 is configured to have a structure in which four rectangular prisms are laminated to each other, and inside the structure are formed a dielectric multi-layer film that reflects B light beam (B light reflecting dichroic film 81) and a dielectric multi-layer film that reflects R light beam (R light reflecting dichroic film 82) with their cross sections placed in the form of a letter X. The cross dichroic prism 80 therefore transmits the G light beam from the liquid crystal light valve 60G and bends the R light beam from the liquid crystal light valve 60R and the B light beam from the liquid crystal light valve 60B, thereby combining the light beam of three colors to form a color image.

The light beams output from the cross dichroic prism 80 is allowed to go incident on the projection lens 110 which is a projection optical system so that the light beams are projected onto the screen 120 by the projection lens 110. In the present embodiment, configurations excluding the projection optical system (the projection lens 110) and the screen 120 are defined as the image display device.

As described above, in the two-modulation optical system of the present embodiment, the incident white light beams are subjected to a luminance modulation by the first optical modulation unit at a front stage. The luminance modulated light beams are then subjected to a color modulation for each color of RGB by the three second optical modulation units at a rear stage. Accordingly, it is possible to display images with extremely high contrast ratio exceeding several 10000:1.

Figure 2:
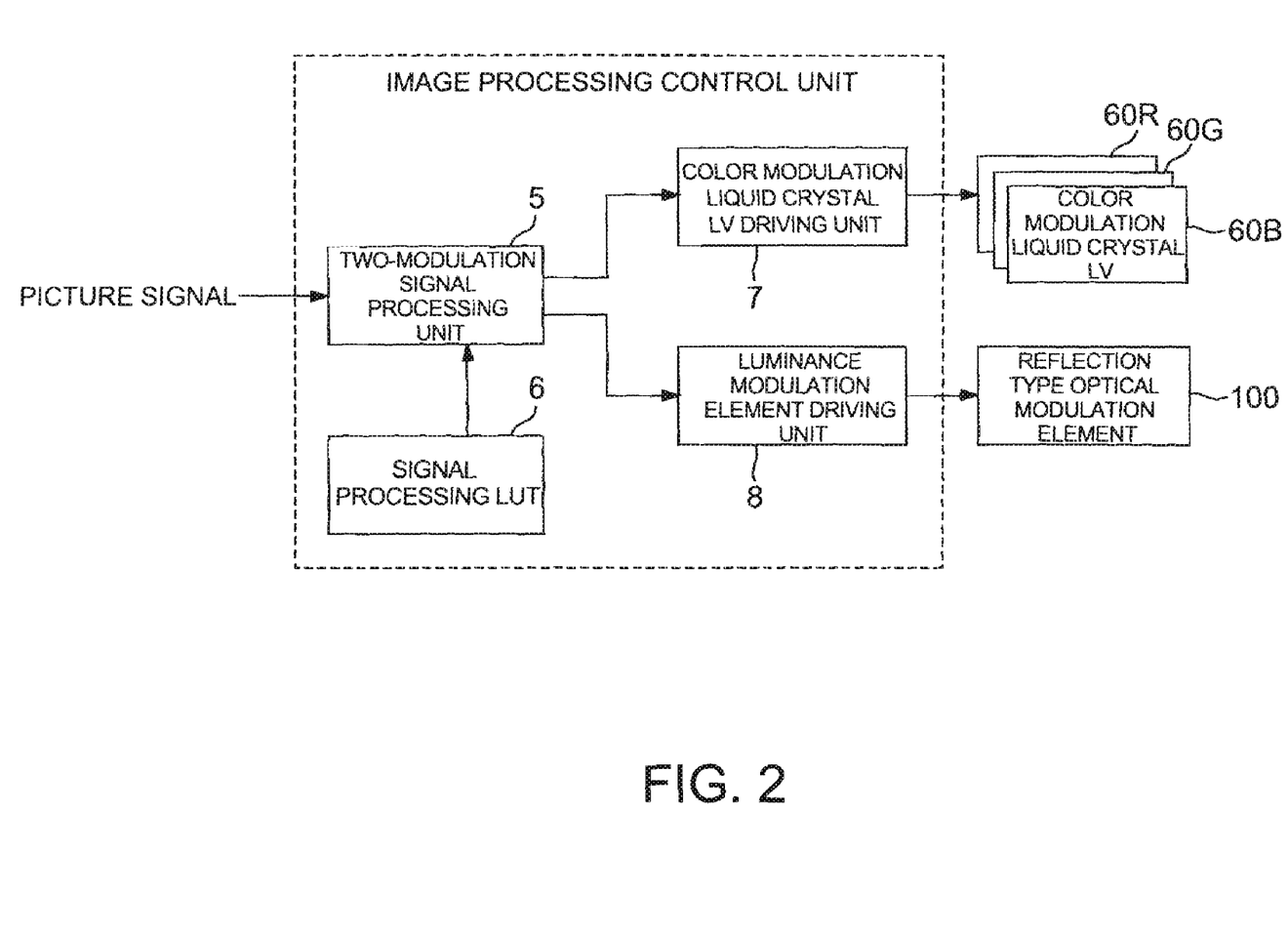
FIG. 2 is a block diagram showing an exemplary configuration of an image processing control unit according to an embodiment of the invention.

Next, an image processing control unit that performs an image display control process (a process of controlling liquid crystal light valves in the reflection type optical modulation element 100 and the color modulation unit 25) in the projector PJ1 shown in FIG. 1 will be described with reference to FIG. 2. FIG. 2 is a block diagram showing an exemplary configuration of the image processing control unit according to the present embodiment.

A two-modulation signal processing unit 5 determines control values for the liquid crystal light valves 60R, 60G, and 60B in the reflection type optical modulation element 100 and the color modulation unit 25 in accordance with a gradation step of an input picture signal and then outputs the determined control values to a color modulation liquid LV drive unit 7 and a luminance modulation element drive unit 8, respectively.

Specifically, the two-modulation signal processing unit 5 generates the control values (corresponding to voltage values for obtaining desired luminance values) for controlling each pixel of the liquid crystal light valves in an non-linear manner and output the generated control values to the color modulation liquid crystal LV drive unit 7. Moreover, the two-modulation signal processing unit 5 generates image symbols (DMD driving signals) constituted by control data for controlling turning ON or OFF of each pixel of the reflection type optical modulation element 100 (for example, DMD) and outputs the generated image symbols to the luminance modulation element drive unit 8 in a sequential manner.

Meanwhile, since the color modulation liquid crystal LV drive unit 7 has a D/A conversion unit, the color modulation liquid crystal LV drive unit 7 converts the digital control values to corresponding analog control values using the D/A conversion unit and then performs an color modulation control process onto the liquid crystal light valves 60R, 60B, and 60G.

Moreover, the luminance modulation element drive unit 8 accumulates the control data of the image symbols input in a digital value in an internal buffer and turns ON or OFF the entire pixels on a display screen of the reflection type optical modulation element 100 at every subfields, thereby controlling the luminance modulation of the reflection type optical modulation element 100.

A signal processing LUT 6 is provided with a lookup table used for determining the control values (driving control values to be described later) for the reflection type optical modulation element 100 and the liquid crystal light valves 60R, 60B, and 60G in correspondence with the input gradation step. The lookup table includes a first lookup table for the reflection type optical modulation element 100 and a second lookup table for the liquid crystal light valves. Here, the second lookup table is prepared for each of the colors, RGB.

Correspondence between the gradation step and the control values (for acquiring luminance values corresponding to the gradation step) set in correspondence with the gradation step is memorized in the first lookup table and the second lookup table.

These control values are predetermined by measuring characteristics of the reflection type optical modulation element 100 and the liquid crystal light valves and used for controlling the gradation of the reflection type optical modulation element 100 in a linear manner and controlling the gradation of the liquid crystal light valves in a nonlinear manner.

In the present embodiments each of the image display devices has a characteristic of displaying a difference between components such as the reflection type optical modulation element 100, the liquid crystal light valves, and the light source 10. Therefore, the control values that are memorized in the first lookup table and the second lookup table are set from the measurement values in correspondence with the component difference in each of the image display devices. Accordingly, the image display device can obtain a desired display characteristic corresponding to the input picture signal.

In this way, the two-modulation signal processing unit 5 determines the control values corresponding to the gradation step of the input picture signal with reference to the first and second lookup tables in the signal processing LUT 6.

In this case, combinations of the reflection type optical modulation element 100 and the liquid crystal light valves used in the luminance modulation and color modulation processes and in the front and rear stages, applied to the arrangement of the present embodiment are equally applicable to various variations.

For example, an arrangement in which a single DMD performs the color modulation process by the use of a rotating color filter and an RGB LED lamp and a single liquid crystal light valve performs the luminance modulation process may be applicable to the present embodiment. In such an arrangement since the liquid crystal light valve in the rear stage can be in a single plate configuration and an optical element such as a dichroic mirror is not required, it is possible to decrease cost dramatically. In addition, since it does not require positioning of the pixels of the three liquid crystal light valves, it is unlikely to cause image deterioration such as pixel errors or moiré.

The liquid crystal light valve may be a reflection type liquid crystal display device such as LCOS (liquid crystal on silicon) as well as a transmission type liquid crystal display device including such as a high temperature polysilicon (HTPS) TFT.

In the present embodiment, the reflection type optical modulation element 100 and the liquid crystal light valves are modulation elements having a number of pixels (720 P) corresponding to "1280×720" and input image signals such as 720 P corresponding to the number of pixels as a picture signal.

The picture signal 720 P has a data format of a raster scanning type (line sequential scanning) in which pixel data for displaying the pixels are sequentially input to each of scanlines (lines of pixels arranged in a horizontal direction) arranged in a direction from the upper part to the lower part of the display screen.

In an analog modulation display device of a line sequential driving type such as LCD (liquid crystal display element) or liquid crystal light valves, the pixel data are rewritten to each of the pixels on each of the scanlines in a line sequential manner, i.e., in a direction from the upper part to the lower part of the display screen.

On the other hand, in a digital modulation display device of a plane rewriting type such as DMD and PDP (plasma display panel), since entire pixels on the display screen are synchronized and turned on or off in the unit of subfields, thereby displaying images using a time integral gradation scheme, it is provided with a buffer for maintaining pixel data for the entire pixels on the display screen, corresponding to at least one frame of input picture signals, thereby turning on or off the display of the entire pixels on the display screen in a synchronized manner.

In the subfield driving, the reflection type optical modulation element 100 reflects light beams coming incident thereon so as to allow the light beams to be directed toward the relay lens 90 in the ON operation and does not allows the light beams to be directed toward the relay lens 90 in the OFF operation. In other words, the gradation is expressed by the use of a total period of subfields in the ON generation (the above-mentioned time integral gradation).

As described in the background section, the digital modulation element of a plane rewriting type such as DMD and the analog modulation element of the line-sequential driving type such as the liquid crystal LV are greatly different from each other in the process of displaying pixels between the method of rewriting pixels in the unit of planes and the method of rewriting pixels in the unit of scanlines. Therefore, in the case of the two-modulation optical system using the two modulation elements in which the methods of rewriting the pixels are different from each other, the quality of images finally displayed on the screen may deteriorate unless a control unit is configured in consideration of the difference in the rewriting characteristics.

Figure 3A:
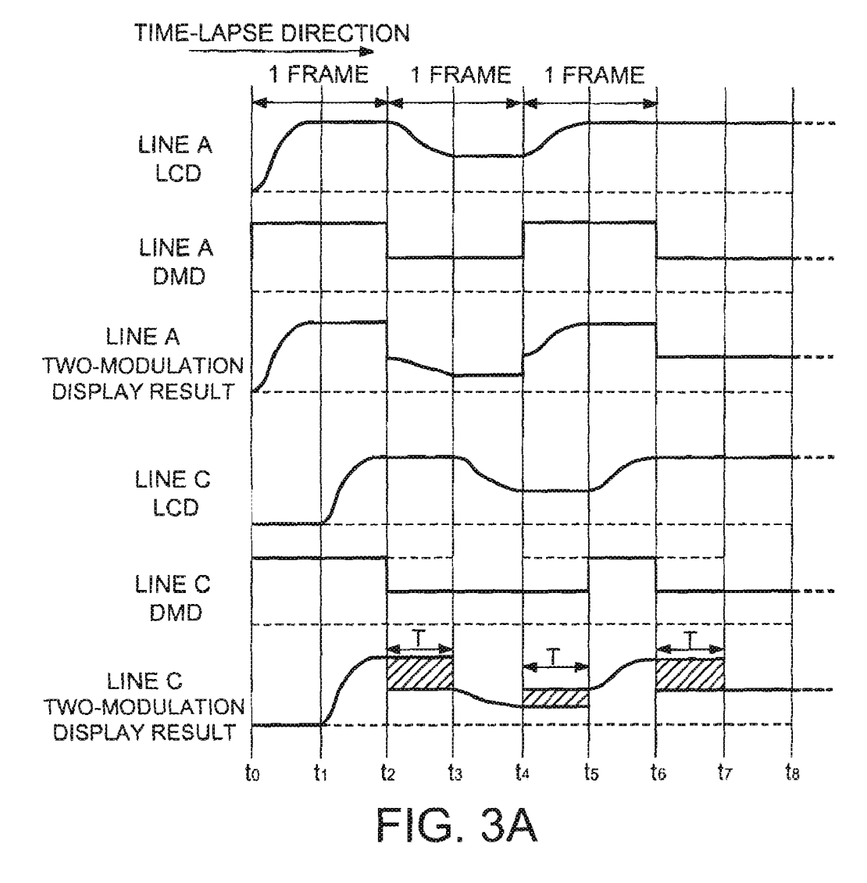
FIGS. 3A and 3B are waveform diagrams for explaining a process of controlling gradation display in a two-modulation optical system including a reflection type modulation element and a liquid crystal light valve in accordance with a first embodiment of the invention.
Figure 3B:
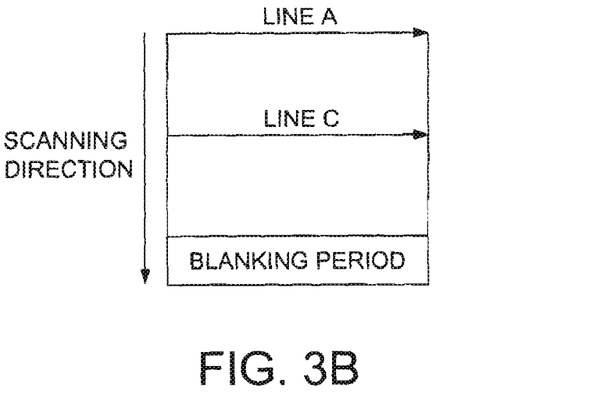

Next, for an easy understanding of variation points of the invention, reasons of the quality deterioration in the display image will be described with reference to FIGS. 3A and 3B. FIG. 3A is a waveform diagram for explaining a writing timing error of the image data in the unit of planes and in the unit of scanlines according to a position of the scanlines (line A and line B) in which a horizontal axis represents a time and a vertical axis represents a level of each signal. FIG. 3B is a schematic diagram showing a scan timing position of the line A and line B in the display screen in which the scan direction (the writing operation is sequentially performed in a direction from the upper scanlines to the lower scanlines) corresponds to a time-lapse direction. A blanking period is prepared to put a margin between an operation of writing image data to each of the pixels on the scanlines in the lowermost stage of a frame and an operation of writing image data to each of the pixels on the scanlines in the uppermost stage of a subsequent frame.

in FIG. 3A, the two-modulation display result of the line A and the two-modulation display result of the line C represent luminance values of pixels in the scanlines of the line A and the line C, respectively. The line A is the scanline in the uppermost stage on the display screen and the line C is the scanline in the middle portion of the display screen.

In FIG. 3B, the scan direction of the picture signal and the liquid crystal light valve corresponds to a direction from the scanline in the uppermost stage to the scanline in the lowermost stage, and the time margin called a blanking period is prepared below the scanline in the lowermost stage.

When comparing timings for rewriting data to pixels on the line A and pixels on the line C (hereinafter briefly referred to as line A and line C while omitting pixel) at the time of driving the liquid crystal, as shown in FIG. 3A, image data is written to the line A at t0 and image data is written to the line C at t1, and one frame is displayed in a period between t0 and t2. In this case, it can be seen that the operation of writing image data to the line C is performed later than the operation of writing image data to the line A by the amount of a half-frame period (time T). In FIG. 3A, since it was assumed that the same image data are written to the line A and the line C, it can be easily seen that the writing timing to the line C lags behind the writing timing to the line A.

With the lagging of the line C to the line A, in order to obtain gradation corresponding to the picture signal as a result of displaying images in the two-modulation optical system in each of the pixels on these lines, it is necessary to display the picture signal on the line C in synchronism with the driving lag of the time T.

On the other hand, since the entire pixels on a plane subjected to a modulation are rewritten in synchronism (simultaneously) to each other at the time of driving the reflection type optical modulation element 100, the image data of each of the pixels on the entire plane of the display screen are rewritten in synchronism with the change of frames at t0, t2, . . . in the unit of frames without causing a lag.

In this way, the timings for rewriting pixels in the reflection type optical modulation element 100 and the liquid crystal light valves are made synchronized to each other in the line A. However, the timing of rewriting pixels in the liquid crystal light valves lags behind the timing of rewriting pixels in the reflection type optical modulation element 100 by the amount of a half cycle of the frame display period in the line B. That is, in a period between t2 and t3, the image data to be displayed in the present frame are rewritten to the pixels of the reflection type optical modulation element 100, but the image data to be displayed in the previous frame are still written to the pixels of the liquid crystal light valves.

As a result, the image data to be displayed in the present frame and the image data to be displayed in the previous frame are superimposed and subjected to a two-modulation process, and a different gradation is displayed to cause a display error, thereby deteriorating the quality of displayed images.

The lagging of rewriting timing of the image data becomes maximum at the scanline in the lowermost stage on the display screen, which corresponds to an amount corresponding to about one frame between the reflection type optical modulation element 100 and the liquid crystal light valves, thereby making the display error greatest.

Therefore, in order to prevent the display error and improve the display quality, it is necessary to control timings for rewriting image data to pixels arranged in a line direction on an area in the reflection type optical modulation element 100 corresponding to the scanlines of the liquid crystal light valves to correspond to the lagging time T of the line C to the line A in synchronism with the timing for rewriting the image data of the liquid crystal light valves, while using the reflection type optical modulation element 100. The invention provides a method of controlling the timing for rewriting image data.

In this case, when a digital modulation element such as DMD is used as the reflection type optical modulation element 100, a frame is divided into subframes (or subfields), each of the subframes is turned ON or OFF, and the gradation is controlled by the ON time of the subframes: that is, the gradation is displayed using a time integral scheme in which each of the subframes is turned ON or OFF in order to display images in a halftone gradation.

In the present embodiment, the lagging of the line C to the line A is adjusted by making data for controlling the subframes to correspond to the scanlines of the liquid crystal light valves in the unit of a line or several lines and controlling the timings for rewriting the data to correspond to the timings for rewriting the image data of the liquid crystal light valves. Accordingly, a problem that the timings for rewriting image data are different from each other in each of the modulation elements of the two-modulation optical system, thereby deteriorating the image quality can be solved.

Figure 4:
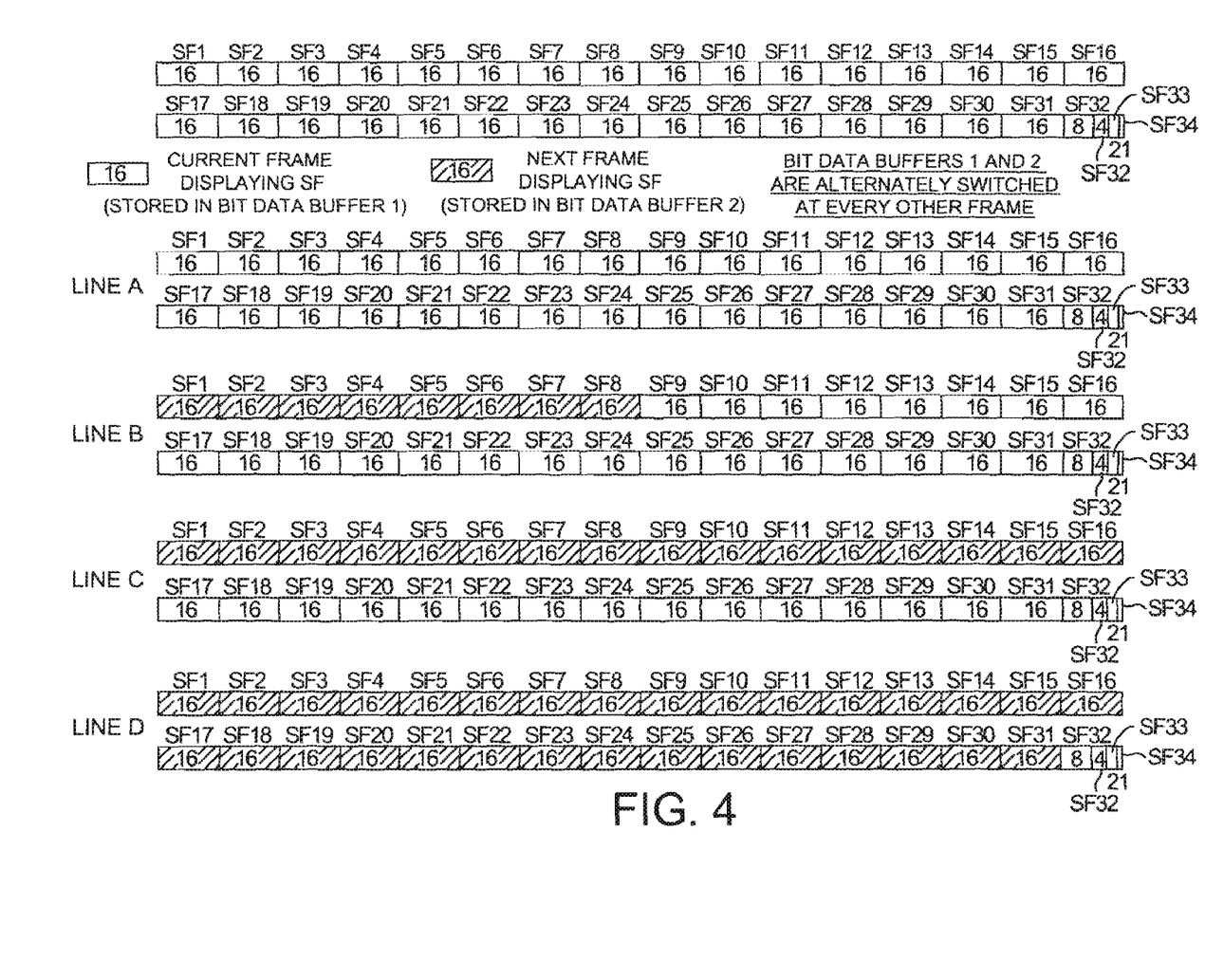
FIG. 4 is a schematic diagram showing a configuration of display data produced by a bit data shifter 83 in accordance with the first embodiment of the invention.

FIG. 4 is a diagram showing a method of producing image symbols as a group of control values for controlling subframes in the frames used in the present embodiment.

In the present embodiment, the subframes are configured in the following manner. When the input picture signal is represented in a gradation of 512 and a result of diving the period of one frame duration by the gradation number of 512 is "1" as a time unit, a length of "16" time units is used as a primary subframe. When the gradation number of 512 is divided by the length of the primary subframe "16" so as to divide one frame into 32 subframes, 31 subframes are used as the primary subframes and remaining one primary subframe is used as a secondary subframe having a time unit of "8", "4", "2", "1", respectively, thereby representing the 512 gradations (however, the configuration of the subframe is not limited to this).

In the present embodiment, by adjusting the number of the primary subframes, a vertical line of a first group is controlled to correspond to the image rewriting timings of a second group of scanlines at corresponding locations of the liquid crystal light valves by using a plurality of lines (for example, in the case of picture signal of 720 P, about 22 lines corresponding to a result of dividing the number of vertical lines (scanlines) by 32, i.e., 720/32≅22) as the first group, thereby adjusting the lagging of the mage rewriting timing of the second group disposed at a lower side of the second group in the uppermost stage of the liquid crystal light valves.

In this case, the rewriting timings are adjusted by shifting the timings for displaying image data to be displayed in each of the frames at every group disposed at the lower side in the unit of the first group in the vertical line of the reflection type optical modulation element 100.

That is, the luminance modulation element drive unit 8 is configured to produce the display data that is a mixture of the image data displayed in the present frame and the image data displayed in the previous frame in one frame in a proportion corresponding to shifted time of the rewriting timing of the second group, corresponding to the position in the first group for generating the display data to be displayed in the present frame and the display data to be displayed in the previous frame, from the data rewriting timing of the reflection type optical modulation element 100.

For example, in FIG. 4, the line A represents the vertical line belonging to the first group disposed in the uppermost stage of the display screen. In this case, the luminance modulation element drive unit 8 is configured to use the entire display data (image symbols constituted by control data for controlling ON and OFF, corresponding to the image data displayed in the present frame) as the image data for the present frame.

In addition, the line B represents the vertical line (for example, the 187-th vertical line from the vertical line disposed at the uppermost part) belonging to the first group disposed at a position separated by about ¼ from the uppermost stage of the display screen. In this position, the timing for rewriting the image data in the liquid crystal light valves lags behind the timing or rewriting the image data in the reflection type optical modulation element 100 by the amount of ¼ of the frame duration in comparison with the case of the line A. Accordingly, the subframes corresponding to the first ¼ of the entire subframes (in FIG. 4, subframes SF1 to SF8) are displayed in accordance with the control data corresponding to the image data of the previous frame, and the remaining subframes are displayed in accordance with the control data of the present frame. For this reason, a portion of image data (that is, control values in the image symbol) in the previous frame is memorized in the present frame, and the image symbols for driving the gradation of the reflection type optical modulation element 100 are produced as the display data.

Figure 5:
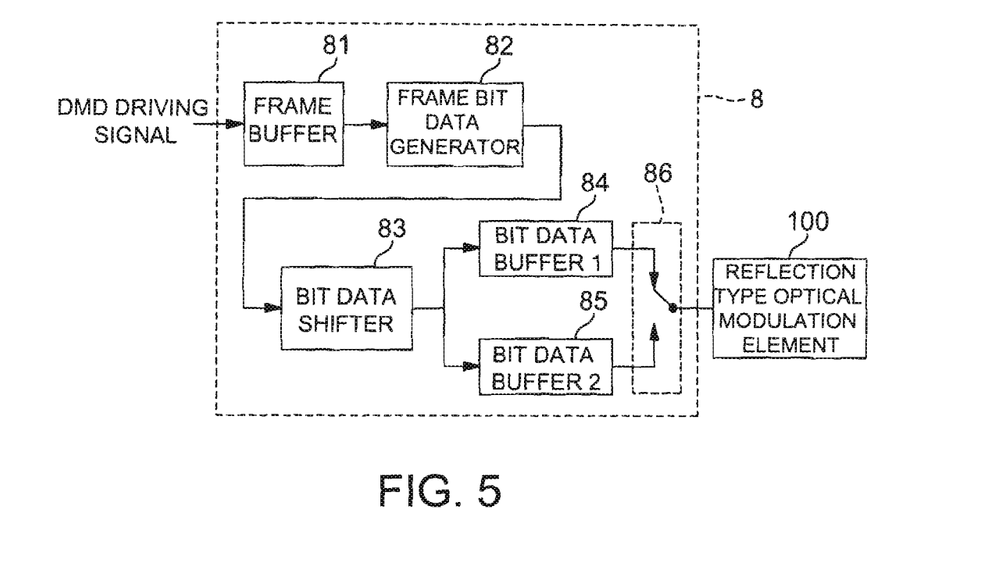
FIG. 5 is a block diagram showing an exemplary configuration of a luminance modulation element drive unit 8 shown in FIG. 2 in accordance with the first embodiment of the invention.

Next, the luminance modulation element drive unit 8 for producing the display data that is a mixture of the image data displayed in the present frame and the image data displayed in the previous frame will be described with reference to FIG. 5. FIG. 5 is a block diagram showing an exemplary configuration of the luminance modulation element drive unit 8 shown in FIG. 2 in accordance with the present embodiment.

When the image symbols for driving the reflection type optical modulation element 100 is input from the two-modulation signal processing unit 5 the frame buffer 81 first maintains the image symbols for the entire pixels on the display screen in the unit of pixels.

Then, the frame bit data generation unit 82 receives driving data in the image symbols from the frame buffer 81 in the unit of subframes and then converts the driving data into frame bit data for turning ON and OFF the pixels, represented by one bit of "1" (for example, ON) or "0" (for example, OFF).

In a known technology, the frame bit data is stored in a buffer in the unit of frames and then sequentially output to the reflection type optical modulation element 100 at every subframe. Then, the reflection type optical modulation element 100 controls the gradation so that the ON and OFF control of the mirror corresponding to each of the pixels is performed simultaneously in the entire pixels on the display screen in accordance with the frame bit data corresponding to each of the pixels.

On the other hand, in the present embodiment, it is necessary shift the frame bit data of the unit of a frame between consecutive frames in the unit of the first group in synchronism with the writing timing of the liquid crystal light valves, thereby mixing the frame bit data for both the present frame and the previous frame in a proportion corresponding to the lagging of the liquid crystal light valves to the reflection type optical modulation element 100.

For this reason, as shown in FIG. 5, the luminance modulation element drive unit 8 is provided with two bit data buffers, that is, a bit data buffer 84 and a bit data buffer 85.

The bit data shifter 83 distributes the frame bit data input from the frame bit data generation unit 82 to the bit data buffer 84 and the bit data buffer 85 in accordance with the mixture proportion in synchronism with the driving timing (image data rewriting timing) of the liquid crystal light valves.

The output control unit 86 switches between the two bit data buffers, that is, the bit data buffer 84 and the bit data buffer 85, in the unit of a frame to be displayed at the time of displaying images so as to transmit corresponding frame bit data to the reflection type optical modulation element 100, thereby realizing a synchronization process for allowing the ON and OFF timings of the first group corresponding to the position of the second groups to correspond to the driving timing of the second group.

The output control unit 86 transmits data to the reflection type optical modulation element 100 in an order starting from a line to which one frame data of the bit data buffer is collected. That is, when the bit data shifter 83 shifts completed frame data of a line N stored in the bit data buffer 84 to the next line N+1, the output control unit 86 transmits the data of the line N from the bit data buffer 84 to the reflection type optical modulation element 100. In order to realize such a function, it is necessary to configure the bit data buffers 84 and 85 as a memory buffer system capable of inputting and outputting data of other lines at the same time.

The status of the bit data buffer 84 and the frame buffer 85 in a frame N will be described with reference to the display data for controlling the line B of FIG. 4. The bit shifter 83 performs a process of distributing the frame bit data in the following manner.

In the present embodiment for an easy understanding, it is assumed that the display data for controlling the reflection type optical modulation element 100 is memorized in the frame N of the bit data buffer 84 and the display data for controlling the reflection type optical modulation element 100 is memorized in the frame N+1 of the bit data buffer 85.

In the bit data buffer 84 to which the display data (image symbols) constituted by the frame data for controlling the reflection type optical modulation element 100 in the present frame N are memorized, since the frame switching timing is shifted by 8 periods of the primary subframes, the frame bit data corresponding to the image data of the previous frame (N−1) are memorized in the primary subframes SF1 to SF8, denoted by hatched lines on the line B, and the frame bit data corresponding to the image data of the present frame N are memorized in the primary subframes SF9 to SF34.

On the other hand, in the bit data buffer 85 to which the display data (image symbols) constituted by the frame data for controlling the reflection type optical modulation element 100 in the next frame (N+1) are memorized, the frame bit data corresponding to the image data of the present frame N are memorized in the primary subframes SF1 to SF8, denoted by hatched lines on the line B, and the frame bit data corresponding to the image data of the next frame (N+1) are memorized in the primary subframes SF9 to SF34.

As described above, when the output control unit 86 outputs the display data to the reflection type optical modulation element 100 from the bit data buffer 85 in the previous frame (N−1), the bit data shifter 83 writes the frame bit data corresponding to the primary subframes, to be displayed in the frame (N−1) to the bit data buffer 84, in a proportion set in correspondence with the above-mentioned lagging of the liquid crystal display elements and then sequentially writes gradation information to be displayed in the frame N to the remaining subframes. When the output control unit 86 outputs the display data to the reflection type optical modulation element 100 from the bit data buffer 84 in the frame N, the bit data shifter 83 writes the frame bit data corresponding to the primary subframes, to be displayed in the frame N, to the bit data buffer 85, in a proportion set in correspondence with the above-mentioned lagging of the liquid crystal display elements and then sequentially writes gradation information to be displayed in the frame (N+1) to the remaining subframes.

As described above, the proportion is used to shift the frame bit data of the first group disposed at the same position as the second group of the reflection type modulation element 100 between consecutive frames by an amount exceeding the frame duration in order to cope with the lagging amount of each position of the second group constituted by the scanlines of the liquid crystal light valves with respect to the data rewriting timing of the reflection type optical modulation element 100.

That is, by forcibly delaying the control of the reflection type optical modulation element 100 in the present frame to the next frame, the image data display timings of the two optical modulation elements having different rewriting timings of the plane rewriting and the line rewriting are synchronized to each other, thereby making it possible to display images without image quality deterioration.

Similar to the above-mentioned processes for the line B, in the lines A, C, and D, a plurality of periods of the primary subframes corresponding to the lagging time of the second rewriting timing of the liquid crystal light valves at corresponding positions from the rewriting timing of the reflection type optical modulation element 100 are shifted between frames in synchronism with the rewriting timing of the second group disposed at positions corresponding to the first group.

In the bit data buffer 84 to which the display data for controlling the reflection type optical modulation element 100 are memorized in the present frame N, since the frame line A belongs to the second group in the uppermost stage of the liquid crystal light valves and there is no delay in the rewriting timing of the reflection type optical modulation element 100, it is unnecessary to shift the frame bit data in the first group, and the data corresponding to the image data of the present frame are memorized in the entire primary subframes.

On the other hand, in the bit data buffer 84, since the scanning order of the second group to which the line C belongs is disposed at a lower stage in comparison with the second group to which the line B belongs and lags behind the rewriting timing of the reflection type optical modulation element 100 by 16 periods of the primary subframes, the frame bit data of the subframes SF1 to SF16 corresponding to the image data of the previous frame (N−1) are memorized in the bit data buffer 84 in order to delay the frame switching timing of the reflection type optical modulation element 100 by 16 periods.

Similarly, in the bit data buffer 84, since the scanning order of the second group to which the line D belongs is disposed at a lower stage in comparison with the second group to which the line C belongs and lags behind the rewriting timing of the reflection type optical modulation element 100 by 31 periods of the primary subframes, the frame bit data (hatched line portion) of the subframes SF1 to SF31 corresponding to the image data of the previous frame (N−1) are memorized in the bit data buffer 84 in order to delay the frame switching timing of the reflection type optical modulation element 100 by 31 periods.

In addition, in the bit data buffer 85 to which the display data for controlling the reflection type optical modulation element 100 are memorized in the next frame (N+1), since the frame line A belongs to the second group in the uppermost stage of the liquid crystal light valves and there is no delay in the rewriting timing of the reflection type optical modulation element 100, it is unnecessary to shift the frame bit data in the first group, and the data corresponding to the image data of the next frame (N+1) are memorized in the entire primary subframes.

On the other hand, in the bit data buffer 85, since the scanning order of the second group to which the line C belongs is disposed at a lower stage in comparison with the second group to which the line B belongs and lags behind the rewriting timing of the reflection type optical modulation element 100 by 16 periods of the primary subframes, the frame bit data (hatched line portion) of the subframes SF1 to SF16 corresponding to the image data of the present frame N are memorized in the bit data buffer 85 in order to delay the frame switching timing of the reflection type optical modulation element 100 by 16 periods.

Similarly, in the bit data buffer 85, since the scanning order of the second group to which the line D belongs is disposed at a lower stage in comparison with the second group to which the line C belongs and lags behind the rewriting timing of the reflection type optical modulation element 100 by 31 periods of the primary subframes, the frame bit data (hatched line portion) of the subframes SF1 to SF31 corresponding to the image data of the present frame N are memorized in the bit data buffer 85 in order to delay the frame switching timing of the reflection type optical modulation element 100 by 31 periods.

In this way, by shifting the switching timing of the display data for controlling ON and OFF of lines in each of the first groups in the reflection type optical modulation element 100 in correspondence with the lagging time of the rewriting timing of the second group from that of the first group in consecutive frames, the rewriting timings (frame switching timing) of the first groups of the reflection type optical modulation element 100 correspond to the rewriting timing of the second group at corresponding position. It is possible to make the image data display timings of the two optical modulation elements to correspond to each other in which the image data rewriting timings are different from each other between a plane rewriting process and a line rewriting process at the time of displaying images on the entire display screen.

As described above, the bit data shifter 83 alternatively switches between the bit data buffer 84 and the bit data buffer 85 in the unit of a frame and shifts and writes the frame bit data in the consecutive frames.

The bit data shifter 83 needs to write the bit frame data to each of the bit data buffers without erasing the frame bit data of the previous frame stored in advance in order to shift the frame switching timing of the reflection type optical modulation element 100. At this time, by setting unnecessary portions of a mask for shifting the bit data of the previous frame and the bit data of the present frame to values "0" and performing an OR computation of both of the bit data with the alignment of corresponding bit positions, it is possible to easily generate the display data to be input to each of the bit data buffers.

In the example of the line B, when the display data is output from one of the bit data buffers and input to the other of the bit data shifter, the mask serves to mask the frame bit data corresponding to the subframes SF1 to SF8 with "0" for the frame bit data for performing the image display corresponding to the next frame and mask the frame bit data corresponding to the subframes SF9 to SF34 with "0" for the frame bit data for performing the image display corresponding to the present frame. The bit data shifter 83 performs an OR computation of bit-streams (image symbols) of the masked frame bit data at corresponding bits so as to combine the frame bit data of the previous frame and the frame bit data of the present frame at the display timing of each frame, thereby generating the display data shifted by the frame duration.

Since the liquid crystal light valves fix the lagging of the image data rewriting timing so that the frame switching is shifted by the period of the hatched primary subfield in the reflection type optical modulation element 100 and the frame bit data corresponding to the image data to be displayed in the present frame are displayed at the blanking period of the liquid crystal light valves in the secondary subframes, it is possible to stably display the gradation and further improve the image quality. Since the writing timing difference is corrected by using only the period of the primary subframe, it is possible to configure the correction process and the circuit in a simple manner, thereby improving the image quality with low production cost.

With the above-mentioned processes, the image rewriting timing of the reflection type optical modulation element 100 in the line C shown in the waveform diagram of FIG. 3A is substantially delayed by the period T corresponding to the dotted line portions so as to be substantially synchronized with the data rewriting timing of the liquid crystal light valves in the line C, thereby removing the display error corresponding to the hatched line portion. Accordingly, it improves gradation display characteristic and prevents image quality deterioration. The frames between t0 to t2 (t2 to t4, t4 to t6) in the line A are shifted by the period T from the frames between t1 to t3 (t3 to t5, t5 to t7) in the line C.

Since it does not require a special light source and a control circuit for controlling the light source to prevent the image quality deterioration and only needs to add a circuit configuration for bit-shifting the luminance modulation element drive unit 8 for driving the reflection type optical modulation element 100, it is possible to improve the image quality at low cost.

Next, an arrangement for improving a moving picture display performance by inserting subfields for black display by the use of the reflection type optical modulation element 100 will be described as a second embodiment. The LCD, the liquid crystal light valves and the like are hold-type display element in which each pixel maintains substantially the same luminance value in one frame duration.

When the moving picture is displayed by using such a hold-type display element, a human may recognize a latent image of the moving picture, thereby substantially deteriorating the image quality. In order to improve the moving picture display performance in such a display element, it may be effective to perform an impulse-type display in which images are displayed only for a predetermined period in a frame like in CRT.

In order to perform the impulse-type display, a technology in which a black image is displayed (black insert) for the predetermined period in the frame by driving the light source or the liquid crystal itself so as to perform a pseudo-impulse display is used in the LCD or the liquid crystal light valves.

However, the black insert may deteriorate the display luminance and require a control circuit for the light source control, thereby increasing the production cost.

In particular, in order to perform the black insert, the LCD or the liquid crystal light valve may need to write a black signal to each of the pixels at every frame. However, since the pixels of the liquid crystals have relatively slow response characteristic, the luminance may be deteriorated in the gradation characteristic by the transient period.

In the case of inserting the black signal using the light source, the same problem as the image data rewriting timings in the combination of the reflection type optical modulation element and the liquid crystal light valve may arise. That is, since the liquid crystal light valves are driven in a line sequential manner but the luminance modulation is performed in accordance with the plane rewriting scheme, it is necessary to perform the black insert in consideration of the driving timing of the liquid crystal light valves in order to obtain a desired gradation.

Accordingly, in JP-A-2001-125067 described in the background section, the light source is controlled in the unit of an area in consideration of the driving timing and the transient characteristic of the liquid crystal display element, thereby displaying images with an excellent gradation characteristic without deteriorating the luminance so much.

However, since the illumination areas of the light source cannot be divided delicately in the case of cathode ray tubes used in general liquid crystal light valves, the image quality and the luminance may be deteriorated.

In addition, it may require an additional control circuit for determining the timing and the area for lighting the light source, thereby increasing the circuit configuration and the production cost.

Contrary to the arrangement of JP-A-2001-125067 described above, in the present embodiment, since it originally performs the two-modulation display, it is possible to perform the black insert by the operation of the reflection type optical modulation element for performing the luminance modulation and delicately adjust the black insert in the unit of a line.

Moreover, since it needs only to add a few circuits to the DMD drive unit, it can be manufactured at low cost.

Figure 6:
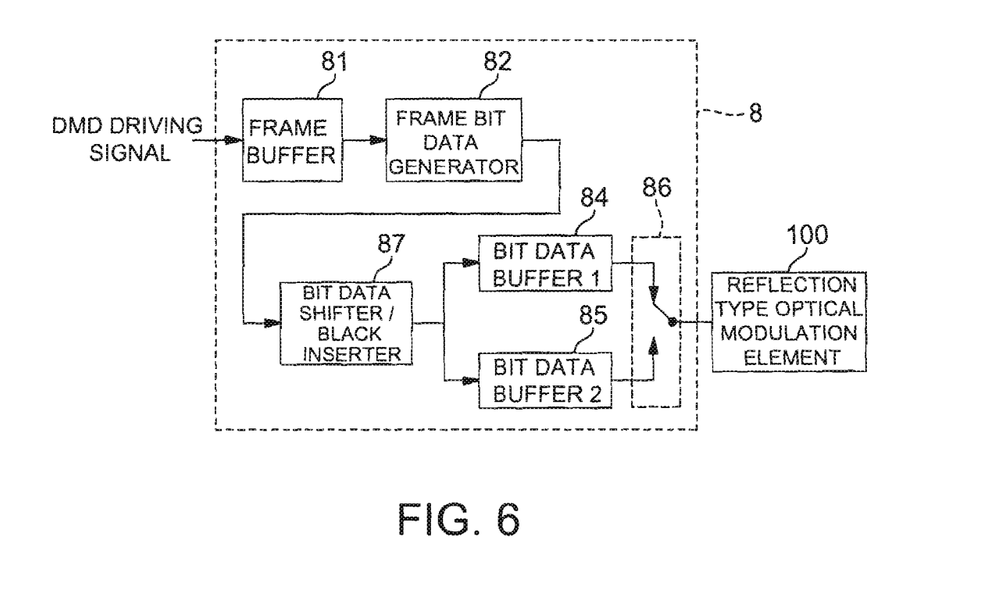
FIG. 6 is a block diagram showing an exemplary configuration of a luminance modulation element drive unit 8 shown in FIG. 2 in accordance with a second embodiment of the invention.

The image processing control unit of the second embodiment corresponds to the luminance modulation element drive unit 8 shown in FIG. 2, modified from the configuration of FIG. 5 to the configuration of FIG. 6. Now, the configuration of the second embodiment will be described with reference to FIG. 6. FIG. 6 is a block diagram showing the configuration of the luminance modulation element drive unit 8 according to the second embodiment. The second embodiment is different from the first embodiment in that the bit data shifter 83 is changed to a bit data shifter and black inserter 87. In the second embodiment, the same configuration as that of the first embodiment will be denoted by the same reference numeral and the description thereof will be omitted.

When writing the frame bit data for controlling the next frame, the bit data shifter and black inserter 87 inserts black insert data (that is, "0" values in the primary subframes for reflection OFF control) between the frame bit data for the present frame and the frame bit data for the next frame with respect to the bit data buffer in a write mode.

Figure 7:
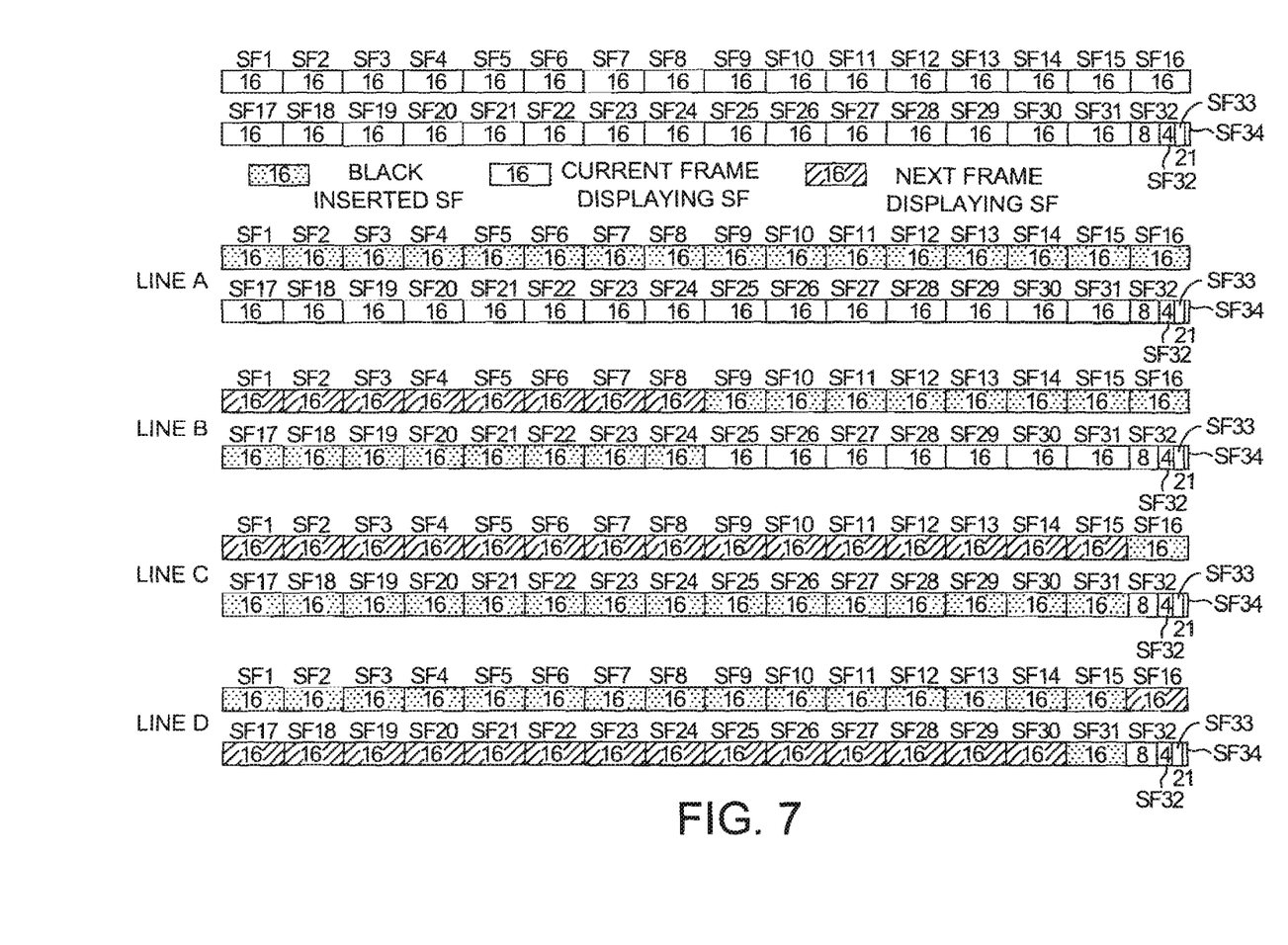
FIG. 7 is a schematic diagram showing another configuration of the display data produced by the bit data shifter 83 in accordance with the first embodiment of the invention.

To describe the configuration, the display data constituted by the frame bit data memorized in each line of the bit data buffer for controlling the next frame are shown in FIG. 7.

Figure 8:
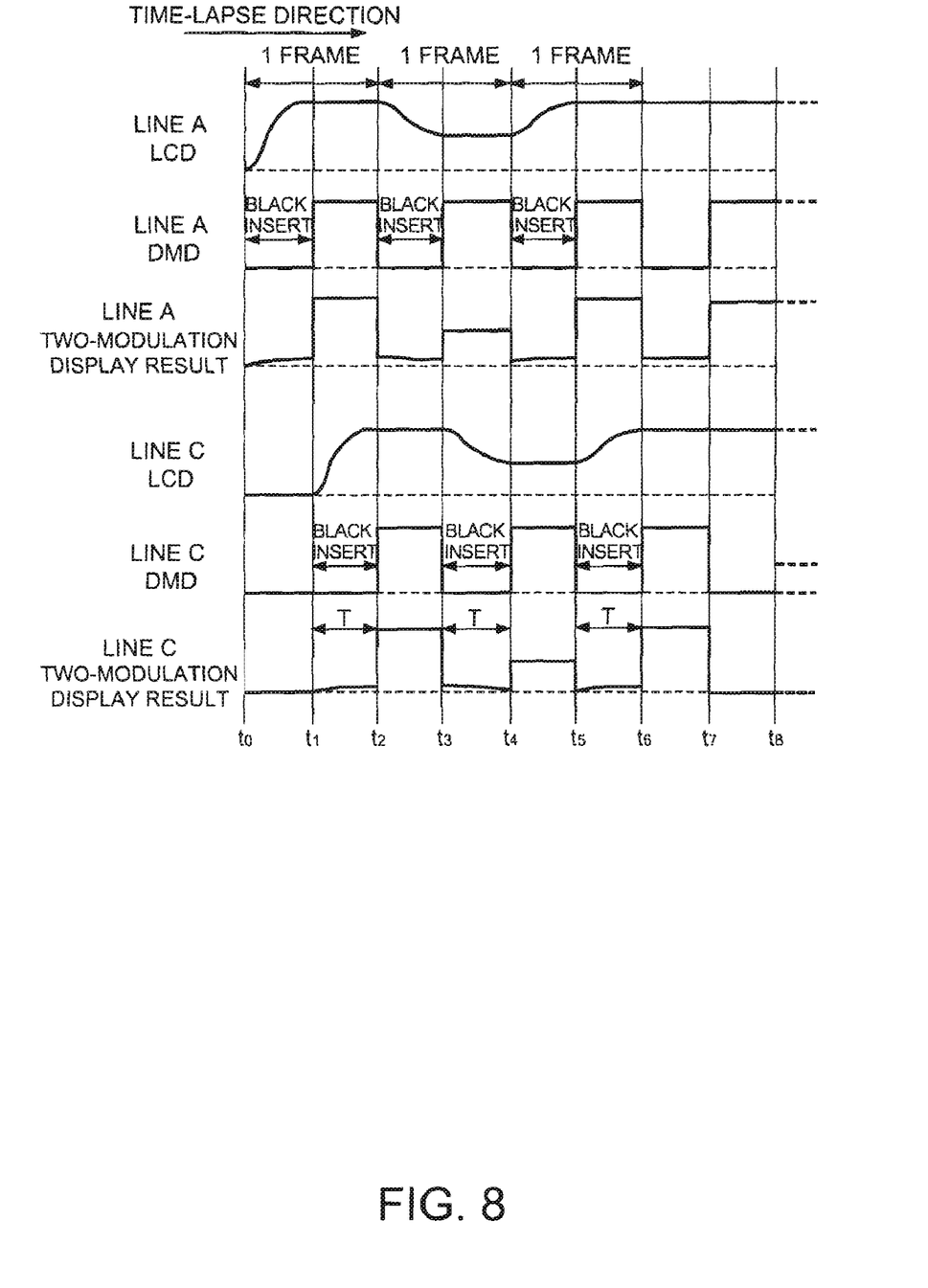
FIG. 8 is a waveform diagram for explaining a process of controlling gradation display in the two-modulation optical system including the reflection type modulation element and the liquid crystal light valve in accordance with the second embodiment of the invention.

When performing the gradation display in a gradation of 256, in a similar manner to the case of the first embodiment, one frame is divided by the gradation number of 512, black signals are inserted to the primary subframe corresponding to a half of the subframe configuration capable of outputting the original gradation number of 512, and the gradation display is performed by the use of the remaining gradation number of 256. In this way, it is possible to perform the black insert in consideration of the driving timing and the transient response characteristic of the liquid crystal light valve as shown in FIG. 8, thereby realizing a high quality moving picture display performance.

In the black insert process, the bit data shifter and black inserter 87 inserts the black signal between the frame bit data for the present frame and the frame bit data for the next frame at the time of writing the frame bit data for controlling the next frame. Therefore, with respect to the line A having no image rewriting timing delay to the reflection type optical modulation element, the black insert is performed to the corresponding bits of the subfields SF1 to SF15, and the frame bit data corresponding to the image data to be displayed in the next frame are memorized in the remaining subfields SF17 to SF34.

In the black insert process, the bit data shifter and black inserter 87 inserts the black signal between the frame bit data for the present frame and the frame bit data for the next frame at the time of writing the frame bit data for controlling the next frame. Therefore, with respect to the line C having an image rewriting timing delay of 15 periods to the reflection type optical modulation element, the frame bit data corresponding to the image data to be displayed in the present frame are memorized in the primary subfield SF1 to SF15, the black insert is performed to the corresponding bits of the next subfields SF16 to SF31, and the frame bit data corresponding to the image data to be displayed in the next frame are memorized in the remaining subfields SF32 to SF34.

As described above, the bit data shifter and black inserter 87 performs the black insert substantially at the frame switching timing when memorizing the display data for controlling the next frame in the bit data buffer.

As a result, as shown in the waveform of FIG. 8 (which has the same configuration as in FIGS. 3A and 3B), the black insert is performed to the subfields corresponding to transient periods of the liquid crystal, t0 to t1, t2 to t3, and t4 to t5 in the line A of the liquid crystal light valves, the black insert is performed to the subfields corresponding to periods t1 to t2, t3 to t4, and t5 to t6 in the line C of the liquid crystal light valves, and the black insert is performed substantially at the frame switching timing in the first and second groups. Therefore, since in the two-modulation display result, the gradation display is not performed in the transient period of the liquid crystal light valve but in a period where the gradation becomes stable, it is possible to improve the image quality.

In addition, since the reflection type optical modulation element such as DMD has a quicker ON and OFF response in comparison with the LCD or the liquid crystal light valves, it is possible to perform a more impulse-like display, thereby greatly improving the moving picture display performance.

Furthermore, a program for realizing processes and functions in the second modulation signal processing unit 5, the color modulation liquid crystal LV drive unit 7, and the luminance modulation element drive unit 8 shown in FIG. 2 (excluding the bit data buffer), excluding the D/A conversion process of the luminance modulation element drive unit 8 may be recorded into a computer-readable recording medium, the program recorded onto this recording medium may be read by a computer system, and each process in caption extract ion device 1 may be performed by executing that program. Furthermore, a "computer system" referred in the present specification includes an operation system (OS) or hardware such as peripheral equipments. When using a World Wide Web system, the computer system may include a WWW system with a webpage-providing (or displaying) environment. In addition, a "computer-readable recording medium" refers to a portable medium such as a flexible disc, magneto-optical disc, ROM or CD-ROM, or a hard disk or other storage device contained within a computer system. Moreover, a "computer-readable recording medium" includes that which retains a program for a fixed period of time in the manner of volatile memory (RAM) within a computer system that serves as a server or client in the case a program is transmitted via a network such as the Internet or a communication line such as a telephone line.

In addition, the above-mentioned program may be transmitted from a computer system that contains this program in a storage device and so forth to another computer system via a transmission medium or by a transmission wave within a transmission medium. Here, the "transmission medium" that transmits a program refers to a medium having a function that transmits information in the manner of a network (communication network) such as the Internet or a communication line such as a telephone line. In addition, the above-mentioned program may also be that for realizing a portion of the above functions. Moreover, it may also be a so-called differential file (differential program) capable of realizing the above functions by combining with a program previously recorded in a computer system.

The present embodiment may be configured in such a manner that PDP (plasma display) elements having a linear gradation characteristic are used as the first optical modulation element for the luminance modulation process.

The entire disclosure of Japanese Patent Application. No. 2006-67599, filed Mar. 13, 2006 is expressly incorporated by reference herein.

What is claimed is:

1. An image display device with a two-modulation optical system for displaying an image corresponding to input image signals, the image display device comprising:
   a first optical modulation element for turning on or off pixels every subfield in a unit of plane,
   a second optical modulation element for displaying gradation of the pixels in a unit of line, the first optical modulation element and the second optical modulation element being arranged optically in series,
   a second optical modulation element drive unit for driving the second optical modulation element in a line-sequential manner; and
   a first optical modulation element drive unit for generating a control signal for a present frame for concurrently controlling all of pixels in the unit of plane in lines disposed to correspond to a unit of single or several lines of the line-sequential driving of the second modulation element with a driving interval in the unit of single or several lines and controlling the first optical modulation element in synchronism with the unit of single or several lines,
   wherein the control signal is constructed to include a first control signal corresponding to a gradation control of subfields in a previous frame and a second control signal corresponding to a gradation control of subfields in the present frame, and
   for each of the lines corresponding to the unit of single or several lines, a proportion of the first control signal to the second control signal in the control signal corresponds to a time delay of the second optical modulation elements with respect to the first optical modulation element drive unit.

2. The image display device according to claim 1,
   wherein the first optical modulation element drive unit includes a first memory and a second memory, and
   wherein when one of the first memory and the second memory outputs the control signal to the first optical modulation element drive unit, the other is allowed to store the control signal for the first optical modulation element in the next frame.

3. The image display device according to claim 1, wherein the first optical modulation element drive unit displays black during a period of single or plural subfields at every field.

4. The image display device according to claim 3, wherein the first optical modulation element drive unit turns off the first optical modulation element during the period of the plural subfields in which black is displayed and controls the gradation of the other subfields of a frame, in the unit of the driving interval.

5. The image display device according to claim 4, wherein the first optical modulation element drive unit interposes the control signal, corresponding to the subfields in which black is displayed, between the first control signal for controlling the subfields of a previous frame and the second control signal for controlling the subfields of the present frame.

6. The image display device according to claim 1, wherein the frame includes a plurality of primary subfields in the same unit of control time and secondary subfields in different units of times into which the time of the primary subfields is divided, and
   wherein the first optical modulation element drive unit sets the proportion of the first control signal and the second control signal so as to correspond to the primary subframes.

7. The image display device according to claim 6, wherein the first optical modulation element drive unit fixes and outputs time positions indicating the secondary subfields in a frame period.

8. The image display device according to claim 7, wherein the first optical modulation element drive unit fixes the time positions to a blanking time of the second optical modulation element drive unit.

9. A projector comprising the image display device according to claim 1 and a projection optical system provided in the image display device.

* * * * *